(12) United States Patent
Zhu et al.

(10) Patent No.: US 8,569,656 B2
(45) Date of Patent: Oct. 29, 2013

(54) ELECTRICAL STORAGE DEVICE HEATER FOR VEHICLE

(75) Inventors: Douglas Zhu, Canton, MI (US); Jacob Mathews, Canton, MI (US); Pax Maguire, Ann Arbor, MI (US); Patrick Padgett, Detroit, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/115,564

(22) Filed: May 25, 2011

(65) Prior Publication Data

US 2011/0272391 A1  Nov. 10, 2011

Related U.S. Application Data

(63) Continuation of application No. 10/897,695, filed on Jul. 23, 2004, now abandoned.

(51) Int. Cl.
*B60L 1/02* (2006.01)
*H05B 1/02* (2006.01)

(52) U.S. Cl.
USPC .......................................... 219/205; 219/490

(58) Field of Classification Search
USPC ......... 219/201, 202, 205, 480, 483, 486, 490, 219/507, 508, 509
See application file for complete search history.

(56) References Cited

U.S. PATENT DOCUMENTS

| | | | |
|---|---|---|---|
| 3,469,072 A | 9/1969 | Carlson | |
| 3,623,916 A | 11/1971 | Toyooka et al. | |
| 3,649,366 A | 3/1972 | Jordan et al. | |
| 4,081,737 A | 3/1978 | Miyahara | |
| 4,667,140 A | 5/1987 | Sweetman | |
| 5,055,656 A | 10/1991 | Farah et al. | |
| 5,115,116 A | 5/1992 | Reed | |
| 5,280,158 A | 1/1994 | Matava et al. | |
| 5,281,792 A | 1/1994 | Lee et al. | |
| 5,356,735 A | 10/1994 | Meadows et al. | |
| 5,362,942 A | 11/1994 | Vanderslice, Jr. et al. | |

(Continued)

FOREIGN PATENT DOCUMENTS

| | | |
|---|---|---|
| DE | 10216906 | 11/2003 |
| EP | 0902348 | 3/1999 |

OTHER PUBLICATIONS

Patent Act 1977: Search Report under Section 17 for Application No. GB0514457.1 dated Sep. 14, 2005.

*Primary Examiner* — Sang Paik
(74) *Attorney, Agent, or Firm* — Carlson, Gaskey & Olds

(57) ABSTRACT

A heater system for an electrical storage device, such as a high voltage traction battery, is connectable to an external AC power source maintain a proper temperature of the battery as long as the system remains connected to the external power source. The battery temperature can be maintained at a level that ensures that the vehicle will start even in extremely cold climates. The heater system includes a heater disposed within the battery itself. Other system components, such as an AC/DC converter and a control module, may be connected to the battery heater system outside of the battery, allowing the battery heater system to act as a modular component that can be easily included in or excluded from a vehicle as an option, either alone or in a package with an engine block heater. The battery heater system is designed so that it can be connected along with the engine block heater to the AC power source using a single common connector.

16 Claims, 4 Drawing Sheets

(56) References Cited

U.S. PATENT DOCUMENTS

| | | |
|---|---|---|
| 5,508,126 A | 4/1996 | Braun |
| 5,710,507 A | 1/1998 | Rosenbluth et al. |
| 5,731,568 A | 3/1998 | Malecek |
| 5,834,131 A | 11/1998 | Lutz et al. |
| 5,871,859 A | 2/1999 | Parise |
| 5,948,298 A | 9/1999 | Ijaz |
| 5,985,480 A * | 11/1999 | Sato et al. ............ 429/65 |
| 5,994,669 A | 11/1999 | McCall |
| 6,002,240 A | 12/1999 | McMahan et al. |
| 6,057,050 A | 5/2000 | Parise |
| 7,097,934 B2 * | 8/2006 | Shigeta et al. ............ 429/62 |
| 2005/0064278 A1 * | 3/2005 | Fetcenko et al. ............ 429/50 |

* cited by examiner

ELECTRICAL STORAGE DEVICE HEATER FOR VEHICLE

CROSS REFERENCE TO RELATED APPLICATIONS

This application is a continuation of U.S. patent application Ser. No. 10/897,695, which was filed on Jul. 23, 2004 now abandoned.

TECHNICAL FIELD OF THE INVENTION

The present invention relates generally to thermal controls for an electrical storage device in a vehicle. More particularly, the present invention relates to a system and method for heating the electrical storage device.

Electric and hybrid electric vehicles have become increasingly popular to meet the demand for fuel-efficient, environmentally-friendly transportation. Such vehicles often include an electrical storage device, such as a high-voltage traction battery, for powering an electric motor to drive the vehicle, either alone or in conjunction with an internal combustion engine, fuel cell engine, or other prime mover.

Currently available electric and hybrid electric vehicles tend to operate more effectively in moderate and warm climates and less effectively in extremely cold climates. This is because high voltage traction batteries tend to lose power as battery cell temperature drops (e.g., below approx. 20° C.). This power decrease results in reduced vehicle performance, fuel economy and drivability. At extremely low temperatures, the traction battery may have insufficient power to even start the vehicle.

Maintaining a proper battery temperature is desirable to ensure optimal vehicle performance in many different climates. Sustaining the battery temperature at a desired level can be challenging because the battery temperature can be affected by many factors, such as the battery condition, the battery cell temperature, the battery charge condition when the vehicle is turned off, and the ambient temperature. Self-powered battery heaters are able to maintain a minimum battery temperature level only for short time periods because the amount of power available for heating is limited by the storage capacity of the battery itself. Thus, self-powered battery heaters are unsuitable when the battery needs to be heated for an extended time period and/or when the battery needs to be warmed to a higher temperature to ensure optimal vehicle performance.

As such, there is a need for a system that can maintain a battery temperature to a level that ensures reliable starting of an electric or hybrid vehicle. There is also a need for a system that can maintain a proper battery temperature in a controlled manner to ensure optimum vehicle performance.

SUMMARY OF THE INVENTION

The invention is generally directed to a battery heater system that can be connected to an external power source outside a high-voltage vehicle battery to maintain a proper temperature of the high-voltage battery as long as the system remains connected to the external power source. The external power source can be, for example, a separate low-voltage battery or a power source outside the vehicle itself. The battery temperature can be maintained at a level that ensures optimal battery performance as well as a minimum level that ensures the vehicle will start in any climate. The high-voltage battery itself can be any appropriate vehicle battery, such as a high voltage traction battery.

In one embodiment, the system includes a battery heater, such as a heater containing thermoelectric heater elements, disposed within the battery system itself. Other heater system components, such as a converter and a controller, may be connected to the heater either inside or outside the battery system. Keeping other system components outside the battery system allows the battery heater system to act as a modular component that can be easily included as a part of the battery itself or as part of an optional vehicle heating package. Moreover, placing the converter and/or the controller outside the battery allows the battery heater system to be easily omitted from vehicles operating in climates that do not require battery heating.

These and other features of the present invention can be best understood from the following specification and drawings, the following of which is a brief description.

DETAILED DESCRIPTION OF THE PREFERRED EMBODIMENT

Figure 1:
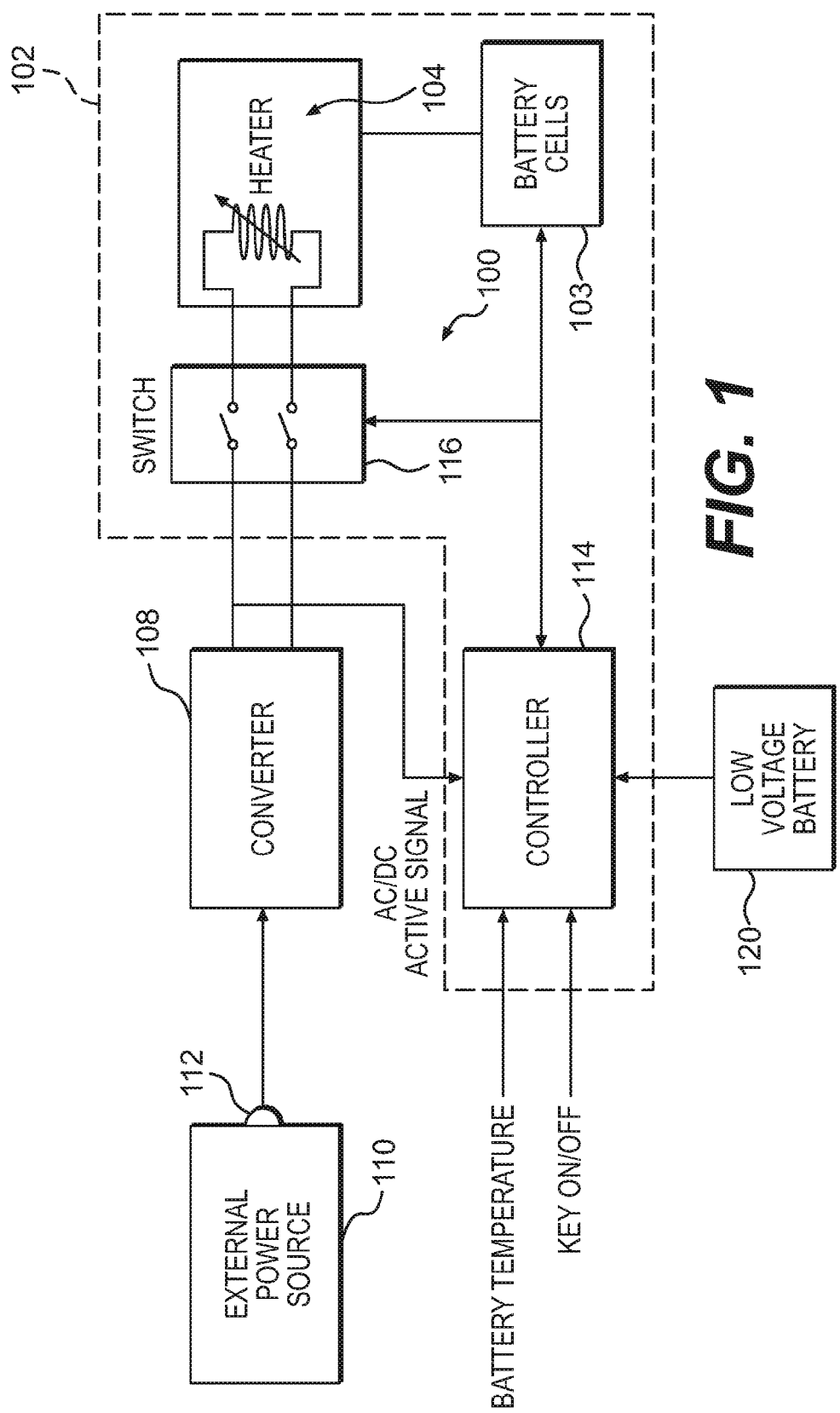
FIG. 1 is a block diagram illustrating a battery heater system according to one embodiment of the invention.

FIG. 1 is a block diagram illustrating components of a battery heater system 100 according to one embodiment of the invention. Generally, the invention is directed to a vehicle battery heater system 100 that is powered by an external power source e.g., a 120V AC power source outside the vehicle or a supplemental low-voltage or accessory battery on-board the vehicle) outside a high-voltage battery system 102 or other electrical storage device. The battery system 102 includes one or more battery cells 103. By using an external power source that is separate from the high-voltage battery system 102 to operate the heater system 100, the invention can keep the battery system 102 warm and regulate the temperature of the battery system 102 reliably when the vehicle is exposed to a cold environment.

As shown in FIG. 1, the battery heater system 100 includes a heater 104 for warming the battery cells 103. The heater 104 itself may have any configuration known and appreciated in the art that is appropriate for regulating the temperature of the battery cells 103. In one embodiment, a plurality of resistive or other thermoelectric heater elements disposed in the battery system 102 act as the heater 104. The heater 104 is coupled to the battery cells 103. The battery cells 103 themselves can be, for example, nickel metal hydride cells, lithium-ion cells, lead acid cells, or any equivalent electric energy storage device. Although the description below focuses on battery cells, the heater system may apply to other electrical storage devices, such as ultra-capacitors, without departing from the scope of the invention.

The heater system 100 also includes a converter 108. In the example shown in FIG. 1, the converter 108 is an AC/DC converter that converts an AC voltage output from an external AC power source 110 to a lower level DC voltage output. The AC power source 110 can be, for example, power from a wall outlet in a garage. A connector 112, such as a conventional three-pronged plug, connects the battery heater system 100 to the AC power source 110. The output of the AC/DC converter 108 or a suitable control signal may also be sent to a controller 114 that controls operation of the heater 104 via one or more switches 116, such as relays, mechanical switches, field effect transistors, etc. In one embodiment, the controller 114 also receives signals indicating a battery temperature, a key on/off condition (e.g., whether a key is in the vehicle ignition), and an AC/DC active signal as inputs and controls operation of the switch 116 based on these inputs.

Alternatively, the controller 114 may be powered by, for example, a separate low-voltage battery 120 or other alternative power source. The low-voltage battery 120 may be, for example, a conventional accessory battery having a nominal voltage output of approximately 10V-15V. If the controller 114 is powered by the low-voltage battery 120, the controller 114 can monitor the temperature of the battery system 102 even when the battery heater system 100 is not connected to the AC power source 110. The controller 114 preferably draws a very small current during operation (e.g., on the order of less than 1 mA). Moreover, by intermittently placing the controller 114 into a sleep mode where it draws minimal current, as will be described in greater below, the controller 114 avoids draining the low-voltage battery 120. The components of the heater system 100 may be connected together via any connection structure, such as an electrical harness (not shown).

Figure 2:
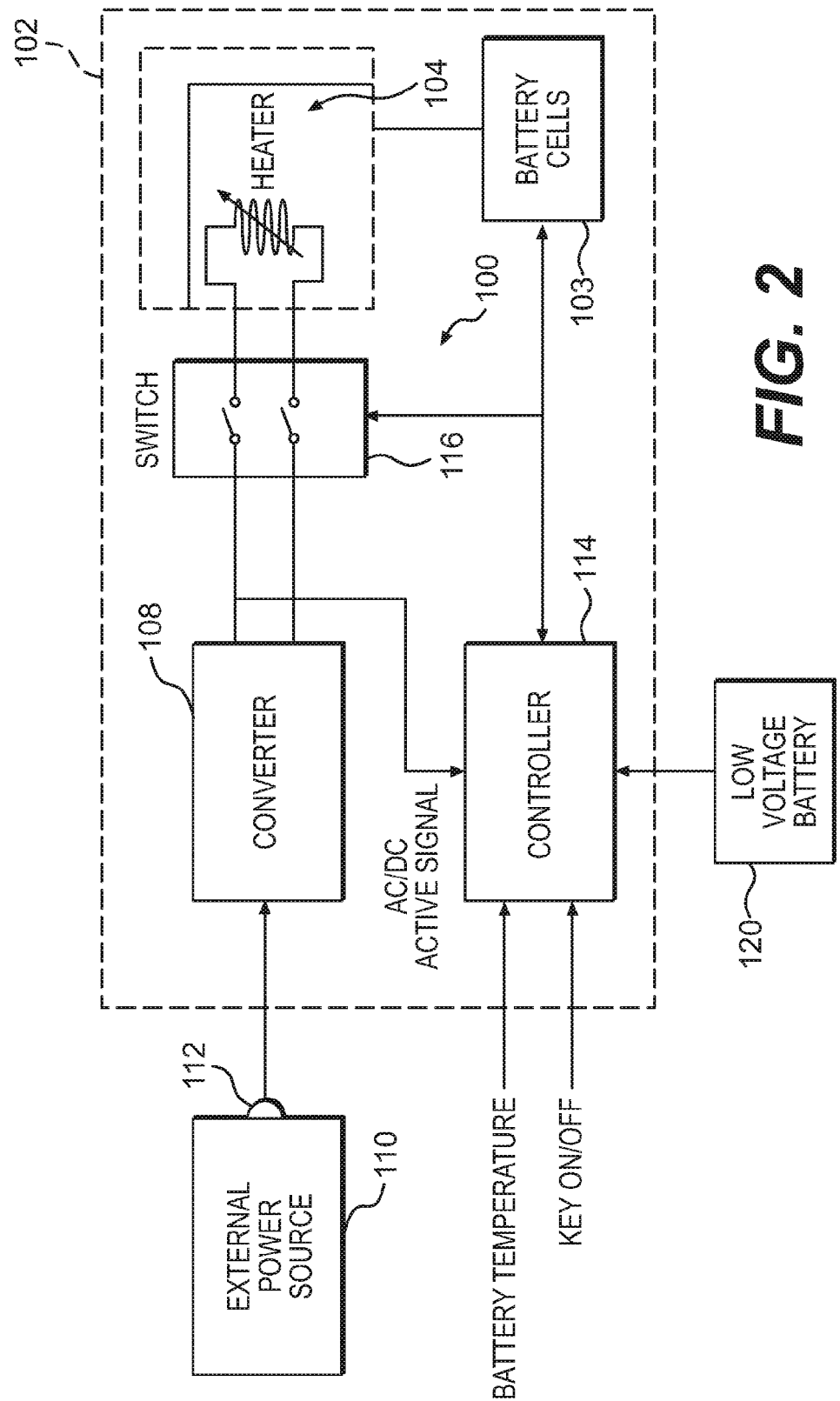
FIG. 2 is a block diagram illustrating a battery heater system according to another embodiment of the invention.

In the example shown in FIG. 1, the controller 114 and the switches 116 are disposed in the battery system 102, while the AC/DC converter 108 may be placed at any location in the vehicle outside the battery system 102. The AC/DC converter 108 tends to be an expensive component; by placing the AC/DC converter 108 outside of the battery system 102, the battery heater system 100 can be marketed as a separate component as part of a vehicle heating package and can be omitted in vehicles that do not require cold weather assistance. Note that other components in the system (e.g., the controller 114 and/or the switch 116) may be placed outside the battery system 102 as well, if desired, to further enhance modularity by placing these components only in vehicles that require it. FIG. 2 illustrates another embodiment of the battery heater system 100 where both the AC/DC converter 108 and the controller 114 are disposed outside the battery system 102.

Moreover, by placing the AC/DC converter 108 outside the battery system 102 (e.g., near a vehicle engine), only low voltage DC electrical lines, as opposed to high voltage AC lines, need to be passed through a passenger compartment of the vehicle, eliminating possible safety concerns. Keeping the AC/DC converter 108 separate from the battery system 102 makes UL certification simpler because certification is needed only for the AC/DC converter 108, as opposed to the entire battery system 102 if the AC/DC converter 108 were included within the battery system 102.

Connecting the battery heater system 100 to the AC power source 110 allows the battery system 102 to be heated for an unlimited time period as long as the connection lasts. This creates a distinct advantage over self-powered battery heaters, which can heat the battery only for a finite time period. Also, the unlimited nature of the AC power source 110 allows the battery system 102 to be heated to a higher temperature without risking power supply drainage, making it possible to maintain the battery temperature to a level that allows the vehicle to start. In another embodiment, the temperature level may be selected to ensure optimum battery performance.

Note that if the supplemental battery is used as the external power source, the converter 108 may be a DC/DC converter. Of course, the converter 108 may also be omitted altogether.

Figure 3:
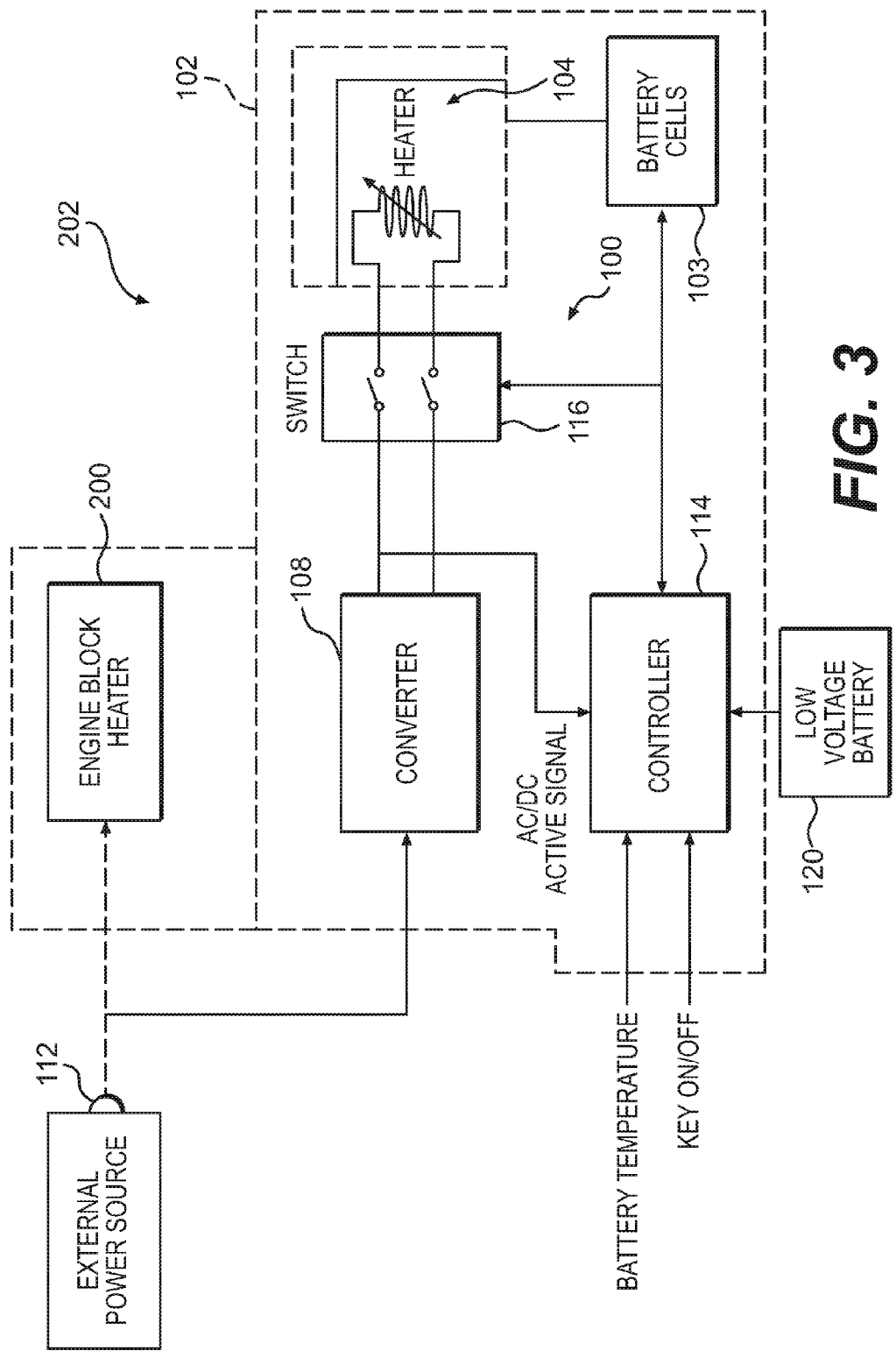
FIG. 3 is a block diagram illustrating an example of the battery heater system in conjunction with an engine block heater.

FIG. 3 illustrates the battery heater system 100 coupled with an engine block heater 200. In extremely cold regions, vehicles are typically equipped with the engine block heater 200 to keep an engine in good working condition in cold climates. Like the inventive battery heater system 100, the engine block heater 200 is designed to be connected to the AC power source 110. The modular design of the inventive battery heater system 100 allows it to be easily coupled to the engine block heater 200.

As shown in FIG. 3, both the battery heater system 100 and the engine block heater 200 may be connected to the same AC power source 110 through a single connector 112 (e.g., a single plug) as opposed to two separate connectors. The single connector 112 is appropriate because the battery heater system 100 and the engine block heater 200 are usually both needed at the same time in extremely cold climates. This streamlines the vehicle heating package 202 and simplifies connection of the battery heater system 100 and the engine block heater 200 to the AC power source 110. The battery heater system 100 and the engine block heater 200 may be offered together as a modular vehicle heating package 202.

Figure 4:
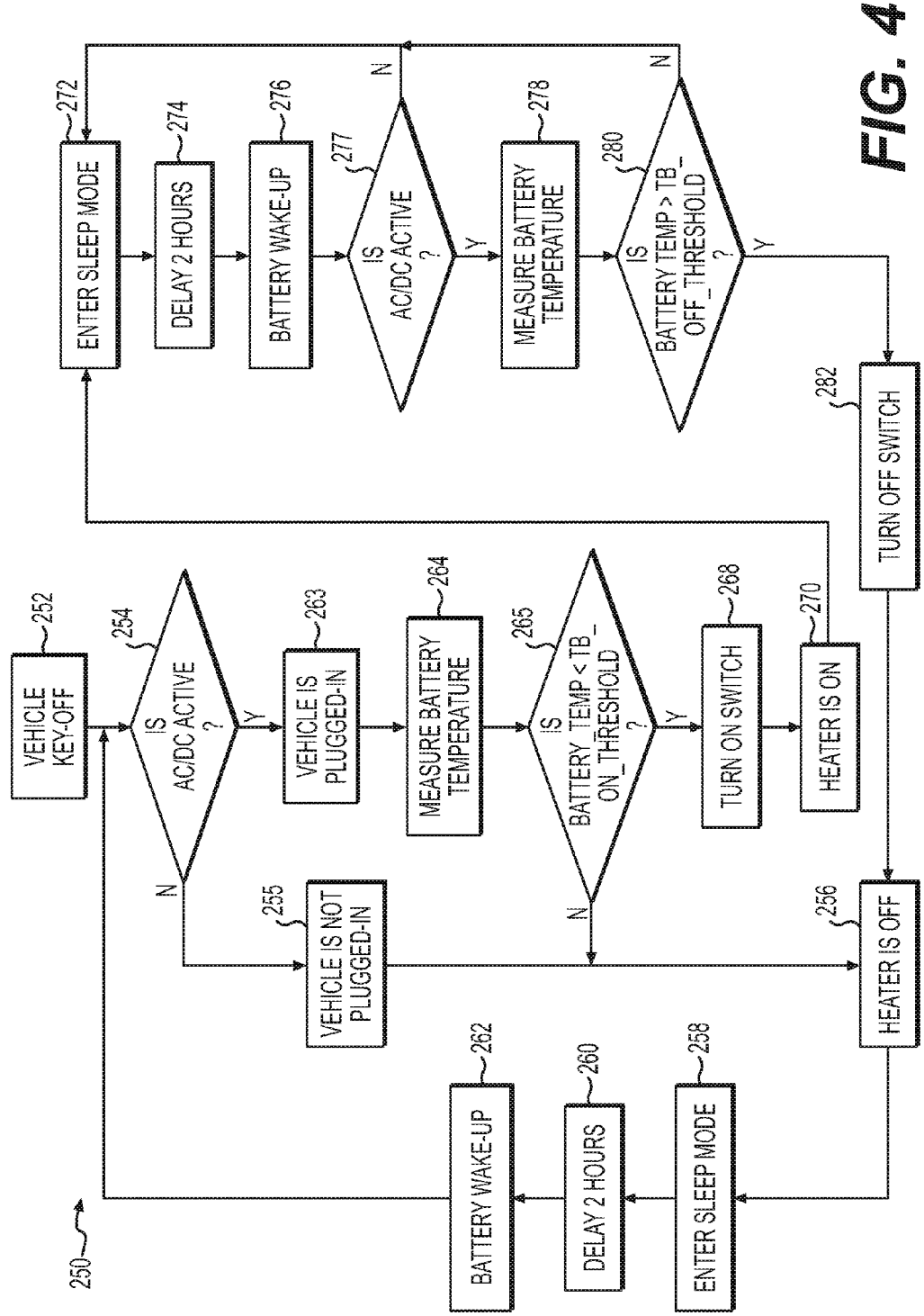
FIG. 4 is a flow diagram illustrating a method for controlling the battery heater according to one embodiment of the invention.

FIG. 4 is a flow diagram illustrating a control process 250 used by the controller 114 to control the battery temperature according to one embodiment of the invention. As noted above, the controller 114 may receive inputs corresponding to battery temperature and a key on/off condition. The controller 114 also checks whether it is receiving the AC/DC active signal to determine whether the battery heater system 100 is connected to the AC power source 110.

In the illustrated control process 250, the controller 114 assumes that the vehicle key is not in a vehicle ignition; that is, the vehicle is in a key-off condition (block 252). The controller 114 then checks whether it is receiving the AC/DC active signal (block 254). If not, the controller 114 assumes that the battery heater system 100 is not connected to the AC power source 110 (block 255) and therefore maintains the heater 104 in an OFF condition (block 256). The controller 114 then enters a sleep mode during which it is inactive. The sleep mode may, for example, reduce the current draw of the controller 114 (block 258). During this sleep mode, the controller 114 waits for a selected period of time (e.g., 2 hours) (block 260) before waking up (block 262). Note that it may be possible to operate the heater when the vehicle is in a key-on condition, if desired, as long as the battery heater system 100 is connected to the AC power source 110.

If the controller 114 is receiving the AC/DC active signal (block 254), it knows that the battery heater system 100 is connected to the AC power source 110 (block 263). The controller 114 then checks the battery temperature (block 264) to determine whether the battery temperature is less than a selected temperature threshold (block 265). As noted above, the temperature threshold is selected to ensure that the vehicle will start and/or ensure optimum vehicle performance.

If the battery temperature is at or greater than the temperature threshold, the controller 114 switches the heater 104 to the OFF condition if it is turned on or leaves the heater 104 in the OFF condition if it is already turned off (block 256). The controller 114 then enters the sleep mode (block 258) as described above, checking the battery temperature again when it wakes up after the selected time period.

If the battery temperature is less than the temperature threshold (block 265), it indicates that the battery system 102 needs to be heated to reach its desired temperature. The controller 114 turns on the switch 116 to connect the heater 104 to the AC power source 110 (block 268). At this point, the heater 104 is in the ON condition (block 270).

The controller 114 then enters a sleep mode (block 272). In this example, the amount of current sent to the heater 102 is low enough so that the heater 104 can remain turned on during the sleep mode without any danger of overheating. Alternatively, the controller 114 may turn the switch 116 on only for a predetermined period of time before turning it off again, without waiting for the controller 114 to wake up out of sleep mode. Note that if the controller 114 is powered by the AC power source 110 rather than the low-voltage battery 120, the controller 114 can monitor the battery temperature 114 continuously rather than only during periodic wake-ups, further optimizing the battery system 102 power without risking overheating.

In the example shown in FIG. 3, the controller 114 remains in sleep mode for the selected time period (e.g., 2 hours) (block 274). The controller 114 then wakes up (block 276) and checks whether it is receiving the AC/DC active signal (block 277). If not, it re-enters the sleep mode (block 272). If the controller 114 is receiving the AC/DC active signal, indicating that the battery heater system 100 is connected to the AC power source 110, the controller 114 measures the battery temperature (block 278). If the battery temperature is at or below the desired temperature threshold (block 280), the controller 114 re-enters the sleep mode (block 272) with the switch 116 closed, thereby allowing current to continue passing through the heater 104 and keep the heater 104 in the ON condition. Of course, if the controller 114 is no longer receiving the AC/DC signal at this stage, the controller 114 opens the switch 116 to switch the heater 104 to an OFF condition.

If the battery temperature is above the temperature threshold (block 278), it indicates that the battery system 102 is at or above the desired optimum temperature, making it unnecessary to continue operating the heater 104. The controller 114 therefore opens the switch 116 to disconnect the heater 104 from the AC power source 110 (block 282) and place the heater 104 in an OFF condition (block 256). The controller 114 then enters the sleep mode (block 258) as described above and delays for the selected time period before waking up to check the battery temperature again.

The inventive battery heater system therefore maintains a desired battery temperature indefinitely by connecting the battery heater to an AC power source rather than relying on its own internal power source. Using the AC power source also allows the battery heater system to work in conjunction with an engine block heater and be powered through the engine block heater's connection to the power source, eliminating the need for separate power source connections. The modularity of the inventive battery heater system also allows it to be included or omitted from a given vehicle easily.

It should be understood that various alternatives to the embodiments of the invention described herein may be employed in practicing the invention. It is intended that the following claims define the scope of the invention and that the method and apparatus within the scope of these claims and their equivalents be covered thereby.

What is claimed is:

1. A battery heater system for a vehicle, comprising:
    an external power source;
    a battery system that is powered by said external power source, wherein said battery system includes a battery cell, a heater that selectively heats said battery cell, and a switch that selectively couples said heater to said external power source; and
    a controller that controls the operation of said heater by selectively operating said switch to couple said heater to said external power source, wherein said controller is powered by a second power source that is separate from said external power source.

2. The system as recited in claim 1, wherein said controller is disposed outside of said battery system.

3. The system as recited in claim 1, comprising an AC/DC converter connected between said external power source and said battery system.

4. The system as recited in claim 3, wherein said AC/DC converter is disposed outside of said battery system.

5. The system as recited in claim 1, wherein said external power source includes a battery located on-board said vehicle.

6. The system as recited in claim 1, wherein said controller monitors said battery system even when said battery system is unconnected to said external power source.

7. The system as recited in claim 1, wherein said battery cell includes one of a nickel metal hydride cell and a lead acid cell.

8. The system as recited in claim 1, wherein said second power source includes a low voltage battery having a nominal voltage output of approximately 10 volts to 15 volts.

9. The system as recited in claim 1, wherein said external power source is a 120V AC power source and said second power source includes a low voltage battery having a nominal voltage output of approximately 10 volts to 15 volts.

10. The system as recited in claim 1, wherein said switch is closed to heat said battery cell if a temperature of said battery system falls below a temperature threshold and said switch is opened to stop heating said battery cell if the temperature of said battery system is above said temperature threshold.

11. A battery heater system for a vehicle, comprising:
    an external power source;
    a battery system that is powered by said external power source, wherein said battery system includes a battery cell, a heater that selectively heats said battery cell, and a switch that selectively couples said heater to said external power source;
    a controller that controls the operation of said heater by selectively operating said switch to couple said heater to said external power source, wherein said controller is powered by a second power source that is separate from said external power source; and
    an engine block heater that is coupled to said battery system and is powered by said external power source, wherein said engine block heater and said battery system are connected to said battery system through a single connector.

12. The system as recited in claim 11, comprising an AC/DC converter connected between said external power source and said battery system.

13. The system as recited in claim 12, wherein said AC/DC converter is disposed outside of said battery system.

14. A method for controlling a battery heater system for a vehicle, comprising the steps of:
    checking whether a key is in a vehicle ignition of the vehicle;
    checking a temperature of the battery heater system;
    checking whether the battery heater system is receiving an AC/DC active signal;
    closing a switch to heat a battery cell of the battery heater system if the temperature of the battery heater system falls below a temperature threshold;
    opening the switch to stop heating the battery cell of the battery heater system if the temperature of the battery heater system is above the temperature threshold; and periodically awakening from a sleep mode to re-check the temperature of the battery heater system.

15. The method as recited in claim 14, comprising the steps of:
remaining in the sleep mode for a selected time period;
awakening from the sleep mode after the selected time period; and
rechecking whether the battery heater system is receiving the AC/DC active signal after the step of awakening from the sleep mode.

16. The method as recited in claim 15, comprising the steps of:
rechecking the temperature of the battery heater system if the AC/CD active signal is received; and
reentering the sleep mode if the temperature is below the temperature threshold.

* * * * *